(12) United States Patent  (10) Patent No.: US 12,502,052 B2
Liu et al.  (45) Date of Patent: Dec. 23, 2025

(54) ENDOSCOPE SYSTEM

(71) Applicant: BEIJING WESTON ASIA-PACIFIC OPTO-ELECTRIC INSTRUMENT CO., LTD., Beijing (CN)

(72) Inventors: Xiaohua Liu, Beijing (CN); Xiatian Wang, Beijing (CN)

(73) Assignee: BEIJING WESTON ASIA-PACIFIC OPTO-ELECTRIC INSTRUMENT CO., LTD., Beijing (CN)

( * ) Notice: Subject to any disclaimer, the term of this patent is extended or adjusted under 35 U.S.C. 154(b) by 320 days.

(21) Appl. No.: 18/255,331

(22) PCT Filed: Dec. 1, 2021

(86) PCT No.: PCT/CN2021/134814
§ 371 (c)(1),
(2) Date: May 31, 2023

(87) PCT Pub. No.: WO2022/117000
PCT Pub. Date: Jun. 9, 2022

(65) Prior Publication Data
US 2024/0023788 A1  Jan. 25, 2024

(30) Foreign Application Priority Data
Dec. 2, 2020 (CN) .......................... 202011385460.2

(51) Int. Cl.
*A61B 1/00* (2006.01)
*A61B 1/04* (2006.01)
*A61B 1/06* (2006.01)

(52) U.S. Cl.
CPC ...... *A61B 1/00105* (2013.01); *A61B 1/00096* (2013.01); *A61B 1/00128* (2013.01);
(Continued)

(58) Field of Classification Search
CPC . A61B 1/00188; A61B 1/00195; A61B 1/002; A61B 1/042; A61B 1/055; A61B 1/0676
See application file for complete search history.

(56) References Cited

U.S. PATENT DOCUMENTS 4,905,082 A    2/1990  Nishigaki et al.
5,359,453 A *  10/1994 Ning ................... G02B 23/243
                                                  600/177
(Continued)

FOREIGN PATENT DOCUMENTS

CN    201822842 U    5/2011
CN    204931617 U    1/2016
(Continued)

OTHER PUBLICATIONS

International Search Report for PCT Application No. PCT/CN2021/134814 mailed on Feb. 24, 2022.

*Primary Examiner* — Michael J Carey
*Assistant Examiner* — Stephen Floyd London
(74) *Attorney, Agent, or Firm* — MLO, a professional corp.

(57) ABSTRACT

An endoscope system, including a rigid endoscope and a photography system, wherein the rigid endoscope includes an external endoscope tube and a connecting housing; the photography system includes a photographic objective lens group and an image sensor; the external endoscope tube includes a first end and a second end; the connecting housing is directly connected to the second end of the external endoscope tube; the photographic objective lens group is arranged on the side of the connecting housing that is away from the external endoscope tube; the image sensor is arranged on the side of the photographic objective lens group that is away from the connecting housing; the photography system is detachably connected to the connecting housing; the photographic objective lens group is configured (Continued)

to directly magnify an image transmitted by the rigid endoscope; and the image sensor is configured to convert the magnified image into an electric signal.

13 Claims, 2 Drawing Sheets

(52) U.S. Cl.
CPC ............ *A61B 1/042* (2013.01); *A61B 1/0676* (2013.01); *A61B 1/00078* (2013.01)

(56) References Cited

U.S. PATENT DOCUMENTS

| | | | | |
|---|---|---|---|---|
| 5,634,881 | A | * | 6/1997 | Francis .................. A61B 1/002 600/920 |
| 5,954,634 | A | | 9/1999 | Igarashi |
| 8,262,559 | B2 | | 9/2012 | Krattiger |
| 2001/0012053 | A1 | * | 8/2001 | Nakamura .......... A61B 1/00193 348/45 |
| 2002/0128539 | A1 | * | 9/2002 | Higuma ............. G02B 23/2453 600/162 |
| 2009/0259098 | A1 | * | 10/2009 | Krattiger ............... A61B 1/0684 600/109 |
| 2014/0336465 | A1 | * | 11/2014 | Demers .............. A61B 1/00188 600/176 |
| 2015/0112133 | A1 | * | 4/2015 | Mattes ................... A61B 1/042 600/109 |
| 2018/0235451 | A1 | * | 8/2018 | Kobayashi ......... A61B 1/00186 |
| 2018/0242828 | A1 | * | 8/2018 | Shiga ................ A61B 1/00188 |
| 2019/0327421 | A1 | | 10/2019 | Emmerich et al. |
| 2021/0373316 | A1 | * | 12/2021 | Desai .................... A61B 1/0684 |

FOREIGN PATENT DOCUMENTS

| | | |
|---|---|---|
| CN | 207768343 U | 8/2018 |
| DE | 3429945 A1 | 4/1985 |
| JP | H075377 A | 1/1995 |
| JP | H08122667 A | 5/1996 |

* cited by examiner

30

ENDOSCOPE SYSTEM

The present application claims the priority of Chinese patent application No. 202011385460.2 filed on Dec. 2, 2020, and the disclosure of the above-mentioned Chinese patent application is hereby incorporated in its entirety as a part of the present application.

TECHNICAL FIELD

The embodiment of the present application relates to an endoscope system.

BACKGROUND

Endoscope, as a medical optical instrument, has a history of more than 200 years. Endoscope has gradually developed from a classic rigid endoscope including optical lenses in the initial stage to a new endoscope that integrates modern technology, such as fiber endoscope, electronic endoscope, capsule endoscope and ultrasonic endoscope.

SUMMARY

Embodiments of the present disclosure provide an endoscope system, which includes a rigid endoscope and a camera system; the rigid endoscope includes an external lens tube and a connection housing; the camera system includes a photographic objective lens group and an image sensor; the external lens tube includes a first end and a second end, the connection housing is directly connected with the second end of the external lens tube, the photographic objective lens group is arranged on a side of the connection housing away from the external lens tube, and the image sensor is arranged on a side of the photographic objective lens group away from the connection housing, the camera system is detachably connected with the connection housing, the photographic objective lens group is configured to directly magnify and image an image transmitted by the rigid endoscope, and the image sensor is configured to convert the image as magnified into an electrical signal. Through the cooperative design of an imaging optical path of the rigid endoscope and the camera system, the endoscope system removes eyepiece group and mechanical structures matched with the eyepiece group such as the eye mask and the connection interface, thereby effectively reducing the processing and assembly costs, thus improving the cost performance of the instrument and fully demonstrating the unique advantages of the rigid endoscope.

At least one embodiment of the present disclosure provides an endoscope system, which includes: a rigid endoscope, including an external lens tube and a connection housing; and a camera system, including a photographic objective lens group and an image sensor; the external lens tube includes a first end and a second end, the connection housing is directly connected with the second end of the external lens tube, the photographic objective lens group is arranged on a side of the connection housing away from the external lens tube, and the image sensor is arranged on a side of the photographic objective lens group away from the connection housing, the camera system is detachably connected with the connection housing, the photographic objective lens group is configured to directly magnify and image an image transmitted by the rigid endoscope, and the image sensor is configured to convert the image as magnified into an electrical signal.

For example, in the endoscope system provided by an embodiment of the present disclosure, a magnification of the photographic objective lens group is in a range from 100 to 300 times.

For example, in the endoscope system provided by an embodiment of the present disclosure, no optical component for magnifying the image is provided inside the connection housing.

For example, in the endoscope system provided by an embodiment of the present disclosure, the camera system includes a camera system housing, the photographic objective lens group and the image sensor are arranged in the camera system housing, and the camera system housing is detachably connected with the connection housing.

For example, in the endoscope system provided by an embodiment of the present disclosure, the photographic objective lens group is a focusing lens group.

For example, in the endoscope system provided by an embodiment of the present disclosure, the rigid endoscope further includes: at least one light-emitting element located at the first end of the external lens tube; an objective lens group located inside the external lens tube and at an end of the light-emitting element close to the connection housing; and a rod lens group located inside the external lens tube and at an end of the objective lens group close to the connection housing.

For example, in the endoscope system provided by an embodiment of the present disclosure, the rod lens group partially extends into the connection housing.

For example, in the endoscope system provided by an embodiment of the present disclosure, the connection housing includes a power supply interface configured to be connected with the at least one light-emitting element.

For example, in the endoscope system provided by an embodiment of the present disclosure, a radial dimension of the connection housing is larger than a radial dimension of the external lens tube.

For example, in the endoscope system provided by an embodiment of the present disclosure, the connection housing is connected with the camera system in a threaded connection manner.

For example, in the endoscope system provided by an embodiment of the present disclosure, the connection housing is connected with the camera system in a fastener connection manner.

For example, in the endoscope system provided by an embodiment of the present disclosure, a material of the connection housing includes medical polymer plastic.

For example, in the endoscope system provided by an embodiment of the present disclosure, a material of the external lens tube includes medical stainless steel.

For example, in the endoscope system provided by an embodiment of the present disclosure, the connection housing and the external lens tube are connected by glue.

BRIEF DESCRIPTION OF DRAWINGS

In order to more clearly explain the technical solutions of the embodiments of the present disclosure, the attached drawings of the embodiments will be briefly introduced below. Obviously, the attached drawings in the following description only relate to some embodiments of the present disclosure, and are not limited to the present disclosure.

DETAILED DESCRIPTION

In order to make the purpose, technical solutions and advantages of the embodiment of the disclosure more clear, the technical solutions of the embodiment of the disclosure will be described clearly and completely with the attached drawings. Obviously, the described embodiment is a part of the embodiment of the present disclosure, not the whole embodiments. Based on the described embodiments of the present disclosure, all other embodiments obtained by ordinary people in the field without creative labor belong to the scope of protection of the present disclosure.

Unless otherwise defined, technical terms or scientific terms used in this disclosure shall have their ordinary meanings as understood by people with ordinary skills in the field to which this disclosure belongs. The terms "first", "second" and the like used in this disclosure do not indicate any order, quantity or importance, but are only used to distinguish different components. Similar words such as "including" or "comprising" mean that the elements or objects appearing before the word cover the elements or objects listed after the word and their equivalents, without excluding other elements or objects. Similar words such as "connect" or "connected" are not limited to physical or mechanical connection, but may include electrical connection, whether direct or indirect.

Although the new endoscope can overcome the technical defects of the classical rigid endoscope in some aspects and has high application value, the rigid endoscope still has a high application penetration rate and market share in the field of clinical diagnosis and treatment because of its unique advantages in image quality and cost performance. In order to further demonstrate the unique advantages of rigid endoscope, it is of great significance to carry out technical research and development.

Figure 1:
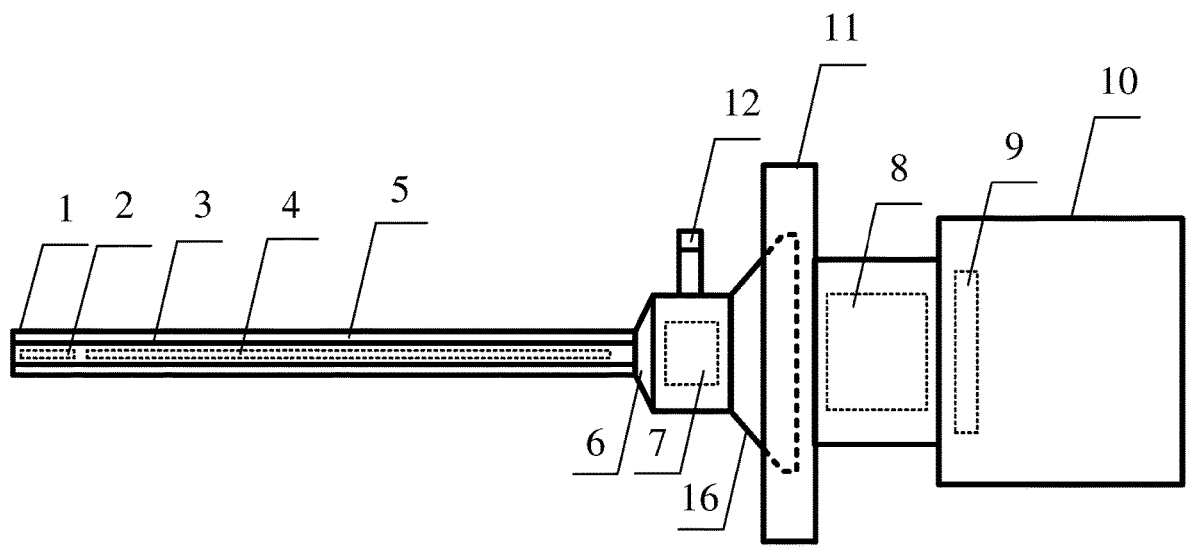
FIG. 1 is a schematic structural diagram of an endoscope system.

At present, in order to facilitate doctors' real-time operation and imaging analysis, rigid endoscope is usually used with electronic camera system to form a complete endoscope system. FIG. 1 is a schematic structural diagram of an endoscope system. As illustrated by FIG. 1, an endoscope system 30 includes an external lens tube 1, an internal lens tube 3, a main lens body 6, a light guide interface 12, an illumination optical fiber bundle 5, an objective lens group 2, a rod lens group 4, an eyepiece group 7 and an eye mask 16. The objective lens group 2 and the rod lens group 4 are arranged in the external lens tube 1; the eyepiece group 7 is arranged in the main lens body 6, and the light guide interface 12 is arranged on the main lens body 6 and is configured to be connected with a light source; the illumination optical fiber bundle 5 can extend from the light guide interface 12 to an end of the external lens tube 1, so that the illumination function can be realized. The endoscope system 30 further includes an electronic camera system 31, which includes a camera system housing 10, a photographic objective lens group 8 and an image sensor 9 both arranged in the camera system housing 10. The electronic camera system 31 can be connected to the eye mask 16 through a connection interface 11.

Figure 2:
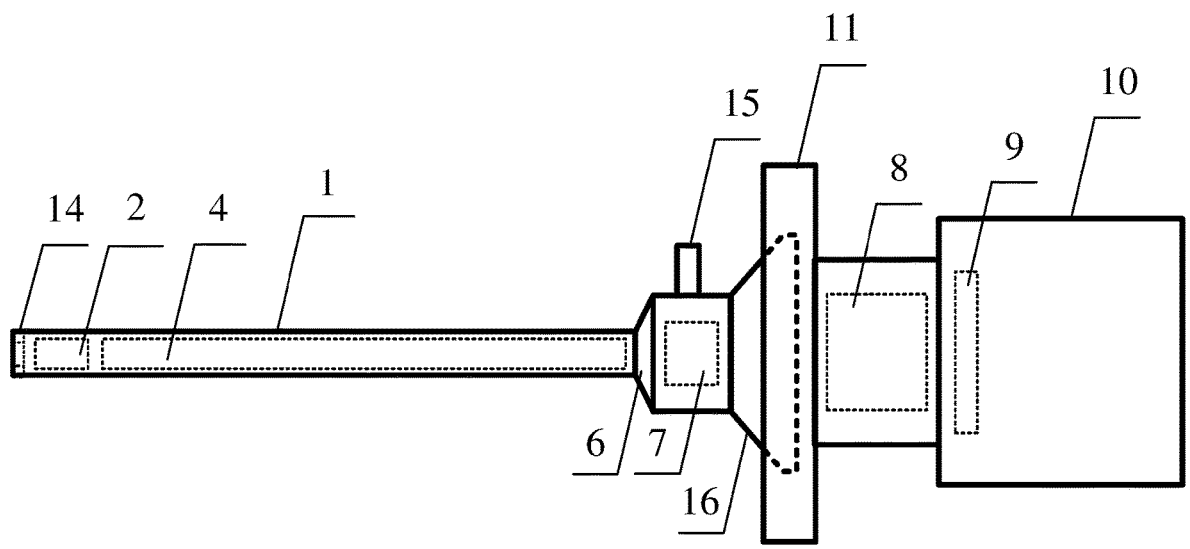
FIG. 2 is a schematic structural diagram of another endoscope system.

FIG. 2 is a schematic structural diagram of another endoscope system. As illustrated by FIG. 2, an endoscope system 30 includes an external lens tube 1, a main lens body 6, a power supply interface 15, a light-emitting chip 14, an objective lens group 2, a rod lens group 4, an eyepiece group 7 and an eye mask 16. The objective lens group 2 and the rod lens group 4 are arranged in the external lens tube 1; the eyepiece group 7 is arranged in the main lens body 6, and the power supply interface 15 is arranged on the main lens body 6; the light-emitting chip 14 is arranged at an end of the external lens tube 1 and can be connected to the power supply interface 15 through a wire, so that power can be supplied to the light-emitting chip 14 through the power supply interface 15. The endoscope system 30 further includes an electronic camera system 31, which includes a camera system housing 10, a photographic objective lens group 8 and an image sensor 9 both arranged in the camera system housing 10. The electronic camera system 31 can be connected to the eye mask 16 through a connection interface 11. The endoscope system illustrated by FIG. 2 uses the light-emitting chip instead of the illumination optical fiber bundle, simplifies the structure of the internal and external double lens tubes of the rigid endoscope, uniformly installs the optical element and the light-emitting chip in the external lens tube, and uses an aspheric lens manufactured by a molding process as the optical element of the endoscope. Therefore, the above design solution improves the imaging quality by dual physical mechanisms of expanding an aperture of the optical system and correcting the aberration by using the aspheric imaging system, and reduces the cost by replacing the optical fiber bundle with the light-emitting chip and manufacturing the lens by adopting the molding process instead of the classical grinding and polishing process. It should be noted that the function of the eyepiece group and the eye mask in the endoscope system is to magnify a relay image transmitted by the rod lens group and image it at an infinite position for human eyes to observe.

In the research, the inventor of the present application noticed that the eyepiece group and eye mask in the above-mentioned endoscope system are used to magnify the relay image transmitted by the rod lens group and image it at an infinite position for human eyes to observe; however, in the process of practical application, rigid endoscope is usually used with electronic camera system, and there is almost no operation link for human eyes to directly observe images behind eyepiece. Therefore, the inventor(s) of the present application envisages that the eyepiece group in the rigid endoscope is a redundant component in the imaging optical system, and the eyepiece group can be removed by optimizing the design of the photographic objective lens and directly secondary magnifying the relay image through the photographic objective lens, thus reducing the cost of the rigid endoscope. In addition, the components matched with the eyepiece group such as the eye mask and the connection interface can further be removed, thereby further reducing the cost of the rigid endoscope.

An embodiment of the present application provides an endoscope system, the endoscope system includes a rigid endoscope and a camera system; the rigid endoscope includes an external lens tube and a connection housing; the camera system includes a photographic objective lens group and an image sensor; the external lens tube includes a first end and a second end; the connection housing is directly connected with the second end of the external lens tube; the photographic objective lens group is arranged on a side of the connection housing away from the external lens tube; the image sensor is arranged on a side of the photographic objective lens group away from the connection housing; the camera system is detachably connected with the connection housing; the photographic objective lens group is configured to directly magnify and image an image transmitted by the rigid endoscope; and the image sensor is configured to convert the image as magnified into an electrical signal. Through the cooperative design of an imaging optical path of the rigid endoscope and the camera system, the endoscope system removes the eyepiece group and mechanical structures matched with the eyepiece group such as the eye mask and the connection interface, effectively reducing the processing and assembly costs, thus improving the cost performance of the instrument and fully demonstrating the unique advantages of the rigid endoscope.

Hereinafter, the present invention will be further described in detail below through specific embodiments with the attached drawings. The application can be realized in many different forms and is not limited to the implementation described in the embodiments.

However, those skilled in the art may realize that the detailed description of one or more of them may be omitted, or other methods, components or materials may be adopted. In some examples, some embodiments are not described or described in detail.

In addition, the technical features and technical solutions described in the present application can also be combined in any suitable way in one or more embodiments.

Figure 3:
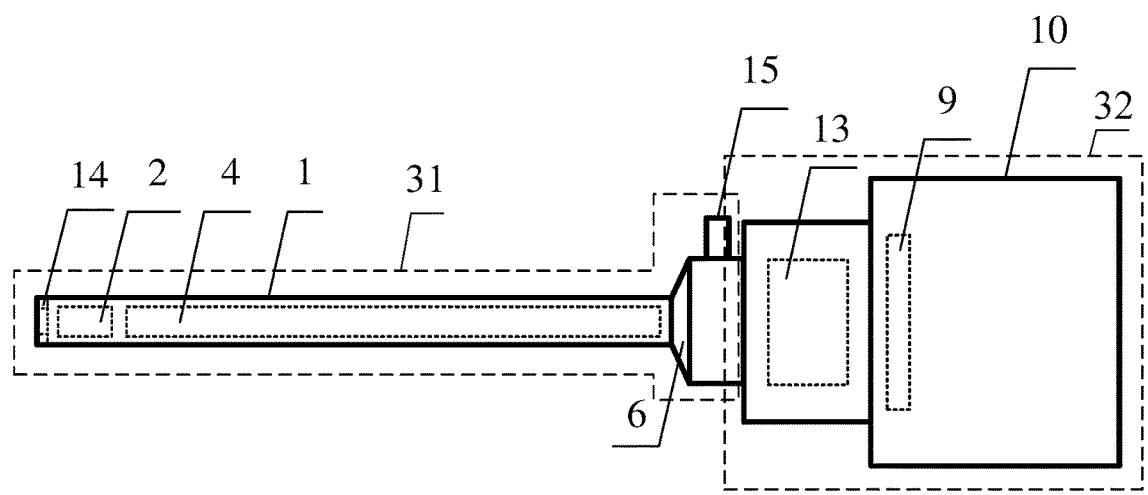
FIG. 3 is a structural schematic diagram of an endoscope system provided by an embodiment of the present disclosure.

An embodiment of the present disclosure provides an endoscope system. FIG. 3 is a structural schematic diagram of an endoscope system provided by an embodiment of the present disclosure. As illustrated by FIG. 3, the endoscope system 30 includes a rigid endoscope 31 and a camera system 32; the rigid endoscope 31 includes an external lens tube 1 and a connection housing 6; the camera system 32 includes a photographic objective lens group 13 and an image sensor 9. The external lens tube 1 includes a first end 1A and a second end 1B, and the connection housing 6 is directly connected with the second end 1B of the external lens tube 1. The photographic objective lens group 13 is arranged on a side of the connection housing 6 away from the external lens tube 1, and the image sensor 9 is arranged on a side of the photographic objective lens group 13 away from the connection housing 6. The camera system 32 is detachably connected with the connection housing 6. The photographic objective lens group 13 is configured to directly magnify and image an image transmitted by the rigid endoscope 31, and the image sensor 9 is configured to convert the image as magnified into an electrical signal.

In the endoscope system provided by the embodiment of the present disclosure, the camera system is detachably connected with the connection housing, components such as an eye mask and a connection interface are not arranged between the camera system and the connection housing, and the photographic objective lens group is configured to directly magnify and image the image transmitted by the rigid endoscope, without additionally arranging an eyepiece group for magnifying the image transmitted by the rigid endoscope. Therefore, the endoscope system can at least omit the eyepiece group, eye mask, connection interface and other components, thus greatly reducing the cost of the rigid endoscope, thereby reducing the cost of the endoscope system. It should be noted that during the use of the endoscope system, the rigid endoscope can be disposable and needs to be replaced frequently; therefore, reducing the cost of rigid endoscope can greatly reduce the use cost of the whole product and has strong product competitiveness.

In some examples, a magnification of the photographic objective lens group 13 is in a range from 100 to 300 times. Therefore, the endoscope system can magnify the image transmitted by the rigid endoscope to a required multiple only by the photographic objective lens group, and there is no need to additionally set an eyepiece group for magnifying the image transmitted by the rigid endoscope. Therefore, the endoscope system can adjust a focal distance and a working distance by optimizing the design of the photographic objective lens, and can also achieve a same magnification as the eyepiece when directly secondary magnifying the relay image through the photographic objective lens. Therefore, for the usage mode of the endoscope at the present stage, the photographic objective lens group can completely realize the function of the eyepiece group, thus the redundant components of the existing rigid endoscope, such as the eyepiece group, the eye mask and the connection interface can be removed.

In some examples, the magnification of the photographic objective lens group 13 is in a range from 180 to 220 times; for example, the magnification of the photographic objective lens group 13 may be 200 times.

In some examples, no optical component for amplification is provided inside the connection housing 6.

In some examples, as illustrated by FIG. 3, the camera system 32 includes a camera system housing 10, in which the photographic objective lens group 13 and the image sensor 9 are arranged, and the camera system housing 10 is detachably connected with the connection housing 6.

For example, as illustrated by FIG. 3, the camera system housing 10 is directly detachably connected to the connection housing 6 without other components.

In some examples, the photographic objective lens group 13 is a focusing lens group. Of course, the embodiments of the present disclosure include but are not limited thereto, and the photographic objective lens group may also be a fixed focus lens group.

In some examples, as illustrated by FIG. 3, the rigid endoscope 31 further includes at least one light-emitting element 14, an objective lens group 2 and a rod lens group 4; the at least one light-emitting element 14 is located at the first end 1A of the external lens tube 1; the objective lens group 2 is located inside the external lens tube 1 and at an end of the light-emitting element 14 close to the connection housing 6; the rod lens group 4 is located inside the external lens tube 1 and at an end of the objective lens group 2 close to the connection housing 6.

Figure 4:
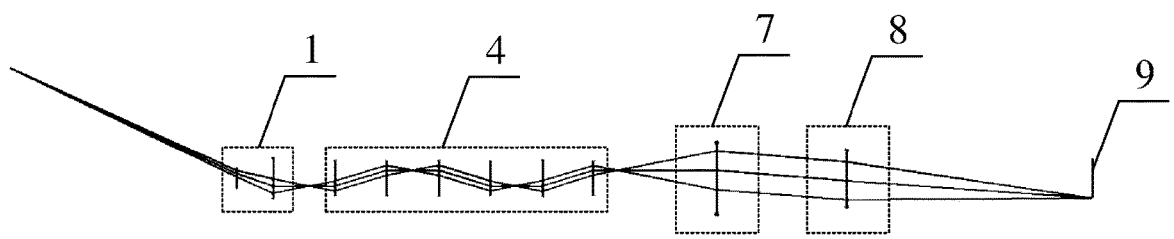
FIG. 4 is a schematic optical path diagram of an endoscope system including an eyepiece group.
Figure 5:
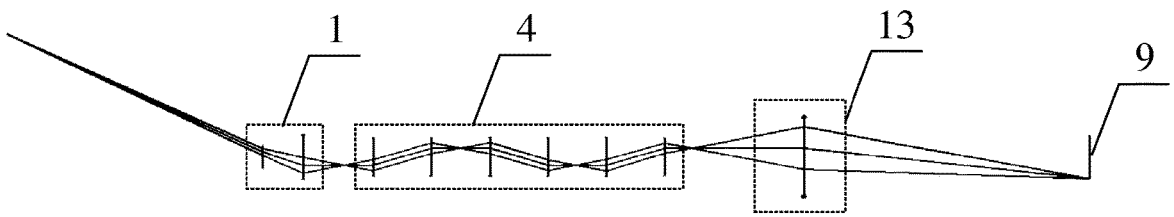
FIG. 5 is a schematic optical path diagram of an endoscope system provided by an embodiment of the present disclosure.

FIG. 4 is a schematic optical path diagram of an endoscope system including an eyepiece group; FIG. 5 is a schematic optical path diagram of an endoscope system provided by an embodiment of the present disclosure. As illustrated by FIG. 4, a reflected light of an object to be imaged is transmitted to an eyepiece group 7 through an objective lens group 1 and a rod lens group 4. After being magnified by the eyepiece group 7, the image of the object to be imaged is magnified and focused again by a photographic objective lens group 8 and then converted into an electrical signal by an image sensor 9. As illustrated by FIG. 5, the reflected light of the object to be imaged is directly transmitted to a photographic objective lens group 13 through the objective lens group 1 and the rod lens group 4, and the image of the object to be imaged is directly magnified and focused by the photographic objective lens group 13 and then converted into an electrical signal by the image sensor 9. It can be seen that the function of the photographic objective lens group 13 illustrated by FIG. 5 is equivalent to the function of both the eyepiece group 7 and the photographic objective lens group 8 illustrated by FIG. 4.

In some examples, as illustrated by FIG. 3, the rod lens group 4 partially extends into the connection housing 6 to better couple with the photographic objective lens group 13.

In some examples, as illustrated by FIG. 3, the connection housing 6 includes a power supply interface 15, and the power supply interface 15 is configured to be connected with at least one light-emitting element 14.

In some examples, as illustrated by FIG. 3, a radial dimension of the connection housing 6 is larger than a radial dimension of the external lens tube 1.

In some examples, the connection housing 6 is connected with the camera system 32 (for example, the camera system housing 10) in a threaded connection manner.

In some examples, the connection housing 6 is connected with the camera system 32 (for example, the camera system housing 10) by in a fastener connection manner. Of course, the embodiments of the present disclosure include but are not limited thereto, and the connection housing and the camera system can also be connected in other detachable ways.

In some examples, a material of the connection housing 6 includes medical polymer plastic. Of course, the embodiments of the present disclosure include but are not limited thereto, and the material of the connection housing can also be a suitable material.

In some examples, a material of the external lens tube 1 includes medical stainless steel.

In some examples, the connection housing 6 and the external lens tube 1 are connected by glue.

An endoscope system described in the present invention, as illustrated by FIG. 3, includes an external lens tube 1, an objective lens group 2, a rod lens group 4, a main lens body 6, an image sensor 9, a camera system housing 10, a matching photographic objective lens group 13, a light-emitting chip 14, and a power supply interface 15. The light-emitting chip 14 is arranged at a front end of the external lens tube 1, the objective lens group 2 is arranged at a rear end of the light-emitting chip 14, the rod lens group 4 is arranged at a rear end of the objective lens group 2, the light-emitting chip 14, the objective lens group 2 and the rod lens group 4 are arranged in the external lens tube 1, a rear end of the external lens tube 1 is connected with the main lens body 6, the main lens body 6 is provided with the power supply interface 15, and a rear end of the main lens body 6 is connected with the camera system housing 10. The image sensor 9 and the matching photographic objective lens group 13 are arranged in the camera system housing 10, and the power supply interface 15 is internally provided with wires, which extend from the inside of the main lens body 6 and the external mirror tube 1 to the region of the light-emitting chip 14, and the wires are electrically connected with the light-emitting chip 14 to transmit electric energy for the light-emitting chip 14, and a number of the light-emitting chips 14 is determined according to the actual application requirements, and at least one is required. It should be noted that the above-mentioned main lens body 6 is the above-mentioned connection housing 6.

The main lens body 6 is made of disposable die-casting molding materials, and all the lenses constituting the objective lens group 2, the rod lens group 4 and the matching photographic objective lens group 13 are made by molding technology.

Preferably, the external mirror tube 1 is made of medical stainless steel.

Preferably, the main lens body 6 is made of medical polymer plastic.

Preferably, the objective lens group 2, the rod lens group 4 and the matching photographic objective lens group 13 are made of optical glass or optical plastics.

For example, the rod lens group 4 may include a plurality of rod lenses arranged in sequence, and a length (dimension in an axial direction of the lens tube) of each rod lens may be greater than its radial dimension. For example, the function of the rod lens group is mainly to transmit the image light without magnifying the image.

Preferably, the external lens tube 1 and the main lens body 6 are connected by gluing.

Preferably, the main lens body 6 is connected with the camera system housing 10 in a fastening screw manner.

Preferably, the main lens body 6 is connected with the camera system housing 10 in a fastening fastener manner.

To sum up, the foregoing is only the preferred embodiment of the present application, and it is not used to limit the protection scope of the present invention. Any modification, equivalent substitution, improvement, etc. made within the spirit and principle of the invention should be included in the protection scope of the invention.

The following points need to be explained:
(1) In the drawings of the embodiment of the present disclosure, only the structure related to the embodiment of the present disclosure is involved, and other structures can refer to the general design.
(2) In case of no conflict, features in the same embodiment and different embodiments of the present disclosure can be combined with each other.

The foregoing is only the specific embodiment of this disclosure, but the protection scope of this disclosure is not limited thereto. Any person familiar with the technical field can easily think of changes or substitutions within the technical scope disclosed in this disclosure, and they should be included in the protection scope of this disclosure. Therefore, the scope of protection of this disclosure should be based on the scope of protection of the claims.

The invention claimed is:

1. An endoscope system, comprising:
a rigid endoscope, comprising an external lens tube and a connection housing; and
a camera system, comprising a photographic objective lens group and an image sensor;
wherein, the external lens tube comprises a first end and a second end, the connection housing is directly connected with the second end of the external lens tube, the photographic objective lens group is arranged on a side of the connection housing away from the external lens tube, and the image sensor is arranged on a side of the photographic objective lens group away from the connection housing,
the camera system is detachably connected with the connection housing, the photographic objective lens group is configured to directly magnify and image an image transmitted by the rigid endoscope, and the image sensor is configured to convert the image as magnified into an electrical signal,
no eyepiece group is provided in the rigid endoscope, the rigid endoscope further comprises:
at least one light-emitting chip located at the first end of the external lens tube;
an objective lens group located inside the external lens tube and at an end of the light-emitting chip close to the connection housing; and a rod lens group located inside the external lens tube and at an end of the objective lens group close to the connection housing, the connection housing comprises a power supply interface configured to be connected with the at least one light-emitting chip.

2. The endoscope system according to claim 1, wherein a magnification of the photographic objective lens group is in a range from 100 to 300 times.

3. The endoscope system according to claim 1, wherein no optical component for magnifying the image is provided inside the connection housing.

4. The endoscope system according to claim 1, wherein the camera system comprises a camera system housing, the photographic objective lens group and the image sensor are arranged in the camera system housing, and the camera system housing is detachably connected with the connection housing.

5. The endoscope system according to claim 1, wherein the photographic objective lens group is a focusing lens group.

6. The endoscope system according to claim 1, wherein the rod lens group partially extends into the connection housing.

7. The endoscope system according to claim 1, wherein a radial dimension of the connection housing is larger than a radial dimension of the external lens tube.

8. The endoscope system according to claim 1, wherein the connection housing is connected with the camera system in a threaded connection manner.

9. The endoscope system according to claim 1, wherein the connection housing is connected with the camera system in a fastener connection manner.

10. The endoscope system according to claim 1, wherein a material of the connection housing comprises medical polymer plastic.

11. The endoscope system according to claim 1, wherein a material of the external lens tube comprises medical stainless steel.

12. The endoscope system according to claim 1, wherein the connection housing and the external lens tube are connected by glue.

13. The endoscope system according to claim 2, wherein the camera system comprises a camera system housing, the photographic objective lens group and the image sensor are arranged in the camera system housing, and the camera system housing is detachably connected with the connection housing.

* * * * *